United States Patent
Gallegos-Lopez et al.

(10) Patent No.: US 7,242,163 B2
(45) Date of Patent: Jul. 10, 2007

(54) SYSTEM AND METHOD FOR CLAMP CURRENT REGULATION IN FIELD-WEAKENING OPERATION OF PERMANENT MAGNET (PM) MACHINES

(75) Inventors: Gabriel Gallegos-Lopez, Alexandria, IN (US); Fani S. Gunawan, Westfield, IN (US); James E. Walters, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 508 days.

(21) Appl. No.: 10/649,145

(22) Filed: Aug. 26, 2003

(65) Prior Publication Data

US 2005/0046370 A1 Mar. 3, 2005

(51) Int. Cl.
*H02P 23/00* (2006.01)
(52) U.S. Cl. .................. 318/812; 318/801; 318/722
(58) Field of Classification Search ............ None
See application file for complete search history.

(56) References Cited

U.S. PATENT DOCUMENTS

| | | | | |
|---|---|---|---|---|
| 6,163,128 A * | 12/2000 | Hiti et al. | .................. | 318/722 |
| 6,222,335 B1 * | 4/2001 | Hiti et al. | .................. | 318/432 |
| 6,288,515 B1 * | 9/2001 | Hiti et al. | .................. | 318/722 |
| 6,407,531 B1 * | 6/2002 | Walters et al. | .............. | 318/805 |
| 6,456,031 B1 | 9/2002 | Gallegos-Lopez et al. | .. | 318/701 |
| 6,486,632 B2 * | 11/2002 | Okushima et al. | ......... | 318/599 |
| 6,501,243 B1 * | 12/2002 | Kaneko et al. | ............. | 318/700 |
| 6,605,912 B1 | 8/2003 | Bharadwaj et al. | | |
| 6,700,400 B2 * | 3/2004 | Atarashi | ..................... | 324/772 |
| 6,707,266 B2 * | 3/2004 | Nakazawa | .................. | 318/432 |
| 6,763,622 B2 * | 7/2004 | Schulz et al. | ............... | 318/700 |
| 6,766,874 B2 * | 7/2004 | Naito et al. | ................ | 180/65.3 |
| 6,771,039 B2 * | 8/2004 | Sakurai et al. | ............. | 318/722 |
| 6,809,492 B2 * | 10/2004 | Harakawa et al. | ......... | 318/609 |
| 6,924,617 B2 * | 8/2005 | Schulz et al. | ............... | 318/701 |
| 6,984,960 B2 * | 1/2006 | Stancu et al. | ............... | 318/801 |
| 7,023,168 B1 * | 4/2006 | Patel et al. | ................. | 318/757 |
| 2002/0113615 A1 * | 8/2002 | Atarashi | ..................... | 324/772 |
| 2002/0145837 A1 | 10/2002 | Krefta et al. | ................. | 361/23 |

\* cited by examiner

*Primary Examiner*—Lincoln Donovan
*Assistant Examiner*—Renata McCloud
(74) *Attorney, Agent, or Firm*—Paul L. Marshall

(57) ABSTRACT

A device to regulate current produced by a permanent magnet machine responsive to a plurality of phase current signals. The motor produces torque for application on a shaft. A processing and drive circuit responsive to a direct current command signal and a quadrature current command signal produces phase current signals for input to the motor. A command circuit responsive to the phase current signals, an angular position of said shaft, and a voltage input command signal to produce a direct current error signal and a quadrature current error signal. A control circuit responsive to the direct and quadrature current error signals produces the direct voltage signal command and the quadrature voltage signal command. The control circuit has a direct and quadrature proportional gain, integrator and clamp circuits. An algorithm produces limited or clamped voltage modulation index signals to obtain maximum efficiency and maximum torque per ampere in the speed range. The algorithm ensures that the current regulator does not run out of voltage by limiting the voltage vector to the achievable voltage vector range that provides maximum torque per ampere and maximum efficiency.

6 Claims, 2 Drawing Sheets

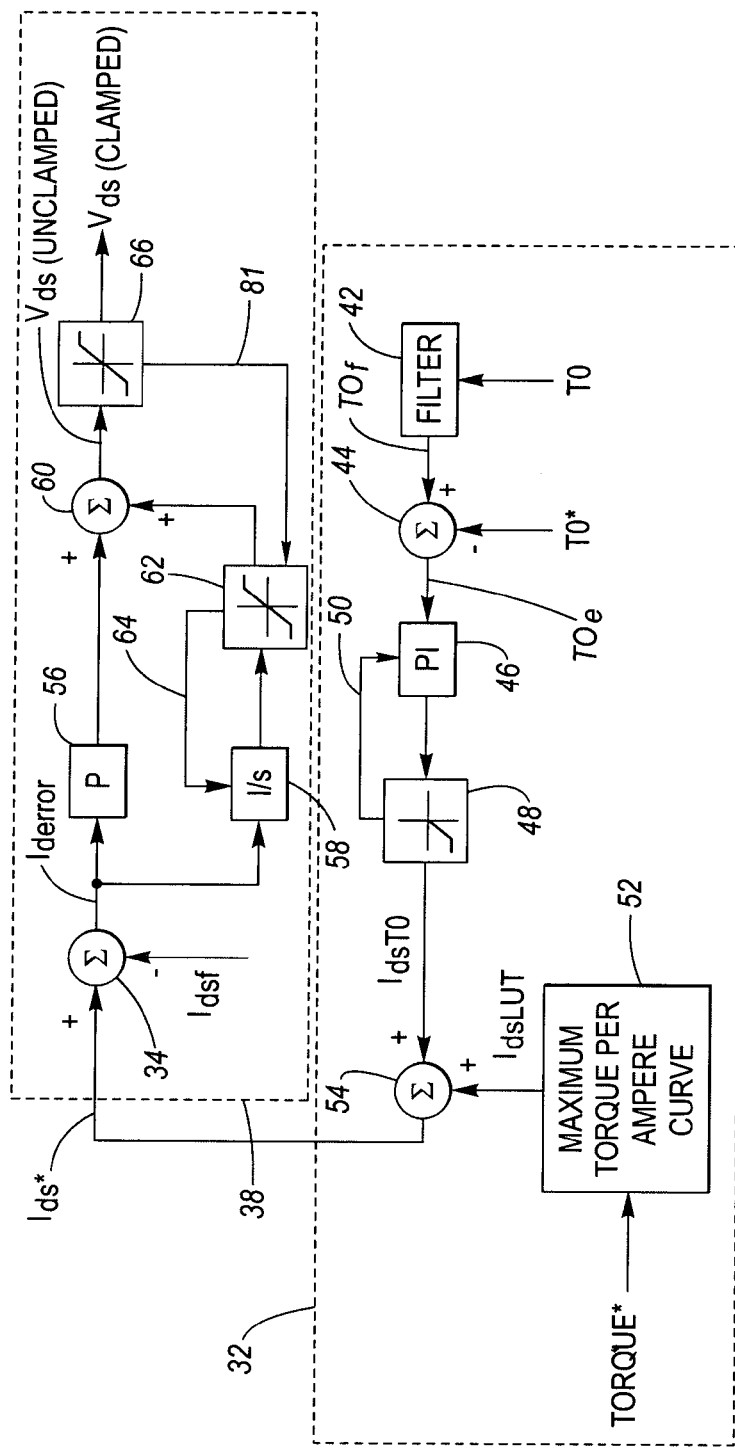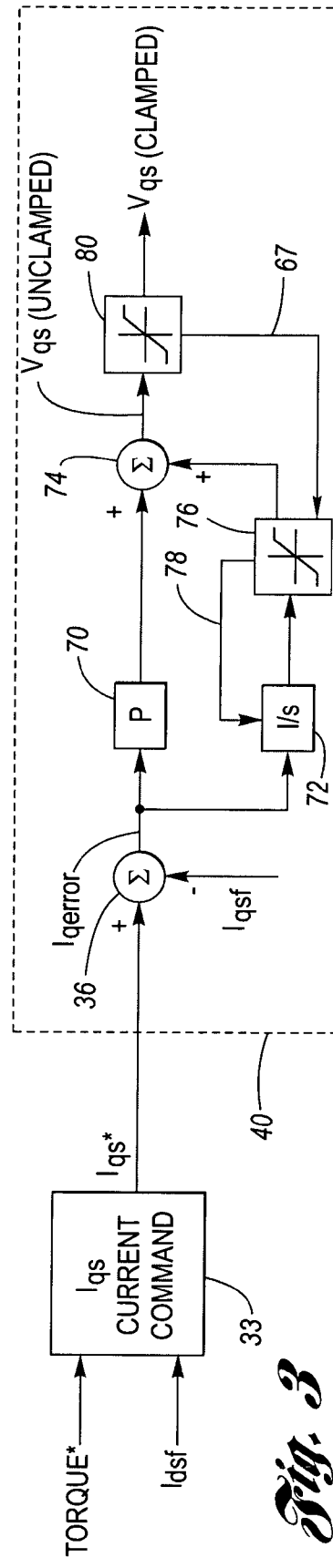
Fig. 2
Fig. 3

SYSTEM AND METHOD FOR CLAMP CURRENT REGULATION IN FIELD-WEAKENING OPERATION OF PERMANENT MAGNET (PM) MACHINES

BACKGROUND OF THE INVENTION

1. Technical Field

The present invention is directed generally to electromechanical machines, and, in particular, to a system and a method for current regulation in the field-weakening operation of permanent magnetic (PM) machines.

2. Description of the Related Art

In the control of inverter-driven permanent magnet (PM) machines, field-weakening is often used to lower the inverter voltage rating for a given application. That is, without field-weakening the inverter manufacturer would have to use components rated to handle higher levels of voltage for that given application. This would undesirably add incremental costs to the drive system. Field-weakening may be accomplished by configuring the machine windings to provide a greater torque per amp ratio, and thus achieve a lower base speed for a given torque load. During high speed operation, the phase current may be applied to the machine windings in advance of the phase electromotive force. To control the electromotive force, the d-axis current is decreased inversely with speed.

Above the base speed of the machine, i.e., where the line-to-line electromotive force voltage due to the magnets has become greater or equal to the source voltage, a field-weakening current is applied to the machine in order to maintain torque. The flux created by this current is in opposition to the rotor flux, and thus reduces the effective electromotive force seen by the inverter. It should be stressed that this current should be carefully regulated to a target value set by the commanded torque and rotor speed. Failure to control the current to an appropriate value will likely result in the application of excessive voltage to the inverter, which is undesirable.

It is known to provide a flux weakening algorithm by the use of a number of look-up tables to produce the reference Q-axis and D-axis currents. However, the use of look-up tables requires the creation of numerous and cumbersome data structures within the look-up tables themselves to handle all possible situations in the system and its environment.

As further background, as alluded to, operation in the field-weakening region of PM machines may involve commanding the required D-axis current (Ids) as a function of speed. This can be implemented as a look-up (noted above) or as a mathematical function. Another disadvantage, however, of this approach is that if the magnetic characteristics of the PM machine change due to rotor temperature variations and/or the DC-link voltage change, the look-up table or function may no longer be valid.

This may cause the current regulator to exceed the voltage limit, which results in the loss of machine control, which is undesirable.

Accordingly, there is a need for a control system that minimizes or eliminates one or more of the above-mentioned shortcomings.

SUMMARY OF THE INVENTION

One object of the present invention is to provide a solution to one or more of the problems as set forth above. The invention relates to system and method for control of permanent magnet (PM) machines. The invention provides additional functionality in the field-weakening region. To extend the operational speed range of PM machines, it is necessary to de-flux the machine by applying a negative Ids current (current in the synchronous D-axis). One advantage of the invention is that it applies the optimal amount of Ids and Iqs at each operating point at and above the base speed of the PM machine.

The invention detects when the output of a current regulator exceeds the available voltage vector, and in response thereto, provides for clamping the proportional-integral (PI) current regulators at the available voltage vector. Through the foregoing, the invention ensures that the current regulator does not run out of voltage, maximizes machine efficiency, and provides a maximum possible torque in the field-weakening region. It is important to note that the base speed point may change significantly depending on DC-link voltage variations and on rotor temperature, which can change the magnetic characteristics of the machine. Nonetheless, a controller in accordance with the present invention is able to properly adjust to the variable base speed.

A device in accordance with the present invention is provided to regulate current provided to a permanent magnet (PM) machine. The device includes a processing and drive circuit, and a current regulator. The current regulator includes a command circuit, a control circuit, and a limiter. The processing and drive circuit is responsive to a direct voltage command signal (Vds) and a quadrature voltage command signal (Vqs) configured to produce a plurality of phase current signals for input to the PM machine. The command circuit is responsive to a current input command signal. The command circuit is configured to produce a direct current error signal and a quadrature current error signal. The control circuit is responsive to the direct and quadrature current error signals and is configured to produce the direct and quadrature voltage command signals. Finally, in accordance with the present invention, the limiter is configured to limit the direct and quadrature voltage command signals to respective preselected levels.

Other features, objects and advantages of the present invention will become apparent to one of ordinary skill in the art from the description that follows and may be realized by means of the instrumentalities and combinations particularly pointed out in the appended claims, taken in conjunction with the accompanying drawings.

BRIEF DESCRIPTION OF THE DRAWINGS

The present invention will now be described, by way of example, with reference to the accompanying drawings, in which:

FIG. 2 illustrates, in greater detail, an exemplary d-axis current clamp arrangement employed in the circuit of FIG. 1.

FIG. 3 illustrates, in greater detail, an exemplary q-axis current clamp arrangement employed in the circuit of FIG. 1.

DESCRIPTION OF THE PREFERRED EMBODIMENTS

Figure 1:
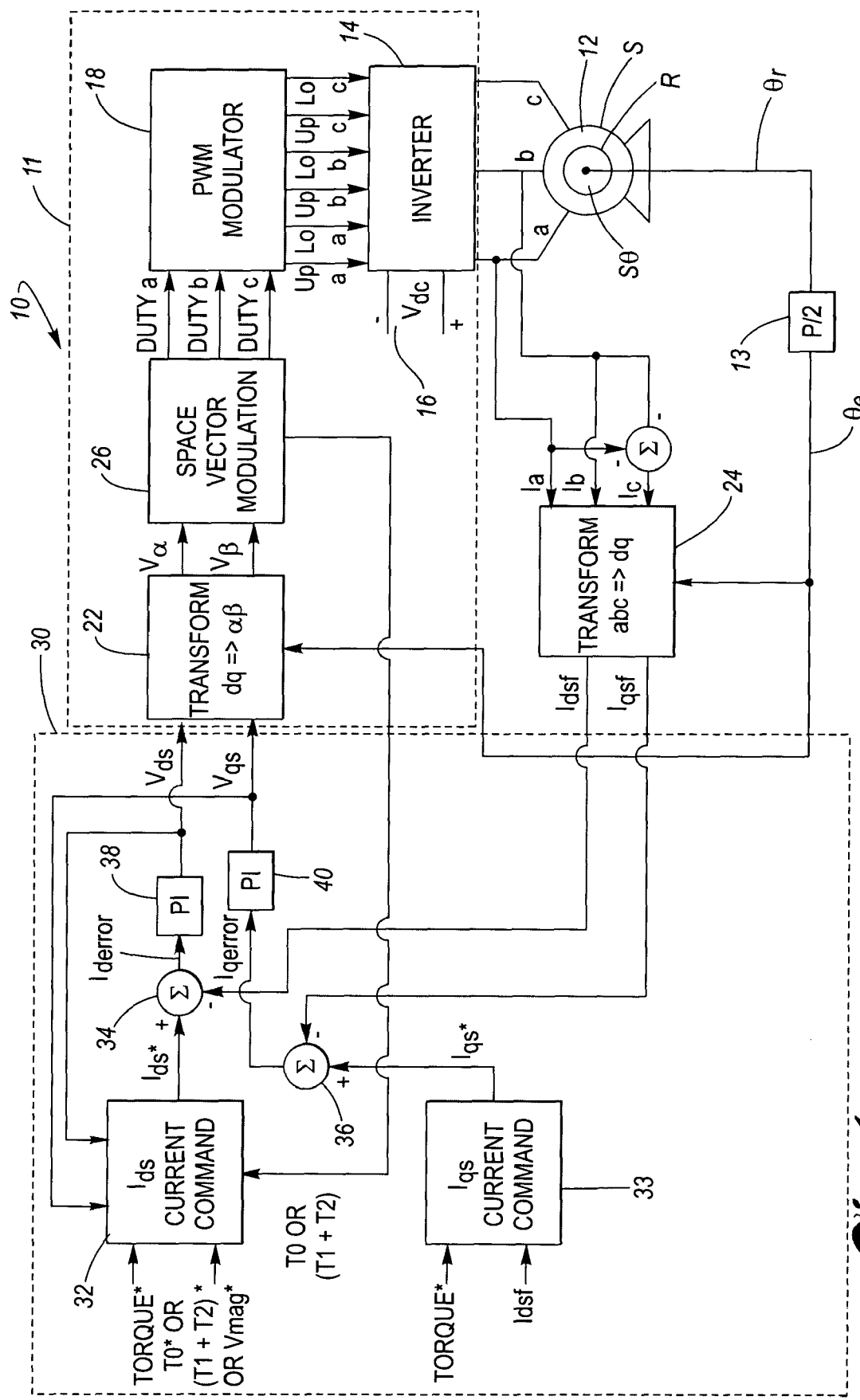
FIG. 1 is a schematic and block diagram of a permanent magnet (PM) machine drive employing an exemplary control system according to the invention.

The invention is directed to a method and apparatus for current control in permanent magnet (PM) machines. The method is configured to produce additional functionality in the field-weakening region.

To extend the operational speed range of permanent magnet (PM) machines, it is necessary to de-flux the machine by applying additional negative current in the synchronous D-axis, Ids. The advantage of the method is that it applies the appropriate amount of current at each operating point across the entire speed range of the machine, that is, in the constant torque region and in the field-weakening region.

An important feature of the invention is that when an output of a current regulator would otherwise exceed the available voltage, the limiter of the invention clamps the voltage vector.

It is important to note that the base-speed point of a PM machine may change significantly depending upon variations in rotor temperature and the DC-link voltage. However, the invention is able to properly adjust to the variable base-speed.

FIG. 1 shows a block diagram of an exemplary system 10 according to the invention. System 10 includes a device for regulating current in a PM machine 12 and includes a processing and drive circuit 11, a transform circuit 24 and a current regulator 30. The device is adapted for controlling a permanent magnet (PM) machine 12, e.g., a motor/generator, having a stator S and a rotor R for driving a shaft.

Processing and drive circuit 11 includes a transform circuit 22, a space vector modulation block 26, a pulse-width modulation (PWM) modulator 18, and an inverter 14. The machine 12 is driven by a three phrase inverter 14 coupled to a DC-link voltage source 16 (Vdc). Vdc is sometimes hereinafter referred to as the link voltage. A pulse width modulator (PWM) 18 drives the inverter 14 in a known way.

Control of the PM machine 12 may be implemented by a digital signal processor (DSP) or the like. Such DSPs are known and are arranged to be responsive to various inputs for producing control outputs, for driving the machine 12 according to the invention. That is, DSPs may be used for implementing one or more of the blocks described herein, in accordance with its respective, described functional requirements. A sensor Sθ is coupled to machine 12 to produce a sensor rotor position (mechanical rotor position) signal $θ_r$. The sensed rotor position signal $θ_r$ is coupled to a conversion block 13 designated "P/2" configured to convert mechanical rotor position into an electrical rotor position $θ_θ$. "P" is the number of machine poles. The electrical rotor position $θ_θ$ is coupled to a pair of coordinate transform circuits 22 and 24, as shown. The coordinate transform 22 transforms D-axis and Q-axis modulation index signals ($V_{ds}$ and $V_{qs}$, sometimes referred to as direct and quadrature voltage command signals) to produce modulation index signals in stationary coordinates α and β. The modulation index signals in the stationary coordinate frame are coupled to and modulated by a space vector modulator 26 in a known manner to produce outputs (designated DUTY a, DUTY b and DUTY c) that drive the voltage PWM modulator 18. These outputs provide the duty cycle information to PWM modulator 18. PWM modulator block 18 generates the gate drive signals for inverter 14 for each of the three phases a, b and c, which provides voltage to machine 12.

Drive phase currents signals a, b and c to machine 12 from inverter 14 drive the machine 12. These are coupled in feedback relation to the coordinate transform 24 which transforms motor drive phase current signals from the inverter 14 to direct and quadrature synchronous feedback axis signals Idsf and Iqsf, respectively. These signals are provided to clamp current regulator 30.

Clamp current regulator 30 is responsive to the direct and quadrature synchronous feedback axis signals Idsf and Iqsf and is configured to produce the direct and quadrature voltage command signals Vds and Vqs. Regulator 30 includes a direct-axis current command block 32, a quadrature-axis current command block 33, summers 34 and 36, and control circuits 38 and 40.

The clamp current regulator 30 includes an Ids current command block 32 and an Iqs current command block 33 which calculate direct and quadrature current command Ids* and Iqs*, respectively (Commands are designated by an asterisk (*)). The current command signals Ids* and Iqs* are summed with the respective direct and quadrature synchronous feedback signals Idsf and Iqsf at summing nodes 34 and 36 respectively. Ids* and Iqs* are each coupled to the non-inverting (+) inputs of respective summing nodes 34 and 36. Idsf and Iqsf are coupled to the inverting (−) inputs of respective nodes 34 and 36. The summed signals output from summers 34, 36 respectively represent the D-axis current error signal $Id_{error}$ or and the Q-axis current error signal $Iq_{error}$. The error signals are coupled to corresponding proportional-integral (PI) control circuits 38 and 40. The outputs of the PI control circuits represent the D-axis voltage Vds and the Q-axis voltage Vqs respectively. These signals are coupled to the transform circuit 22 for appropriate transformations as noted above. The voltage signals Vds and Vqs are also fed back to the Ids current command block 32 as shown.

The proportional-integral control circuits 38 and 40 (i.e., PI current regulators) include limiters for clamping the D-axis and Q-axis modulation index signals Vds and Vqs to predetermined voltage levels to prevent an undesirable loss of current regulation, to maximize machine efficiency and to provide maximum torque in the field-weakening region.

The current command circuit 32 receives a Torque* command input, and a zero vector time control command signal T0* as an input. Alternatively, the current command circuit 32 may receive, in lieu of T0*, a quantity corresponding to the addition of a time 1 vector (T1) and a time 2 vector (T2) as a control signal, i.e., designated as (T1+T2)* in the drawings. In a still further embodiment, again in lieu of T0* or (T1+T2)*, circuit 32 may receive a voltage magnitude command signal, designated $V_{MAG}$*. Note that T0+T1+T2=1. The Ids current command circuit 32 receives a feedback signal corresponding to the zero vector time T0 from space vector modulator 26. The feedback signal from space modulator 26 may alternatively be in the form of the sum of vectors 1 and 2 i.e., (T1+T2) or according to a known relationship, namely $V_{MAG} = \sqrt{Vds^2 + Vqs^2}$.

FIG. 2 illustrates in greater detail the Ids current command circuit 32 and control circuit 38. First, circuit 32 will be described in greater detail. As illustrated, for the D-axis, the zero time vector T0 is fed back from space vector modulator 26 and is input to a ripple filter 42. The output of filter 42 is a time zero feedback output T0$_f$ which is provided to the non-inverting (+) input of summer 44. The zero time vector control command signal T0* is coupled to the inverting input (−) of the summer 44. The difference produced by and output from summer 44 is an error signal T0$_e$ which is coupled to a proportional integrator (PI) circuit 46, whose output feeds limiter or clamp 48. The clamp 48 has a feedback loop of 50, which is coupled to the PI circuit 46 as shown. The limiter 48 produces an output designated IdsT0, which is limited to values less than or equal to zero in a preferred embodiment, although more generally, such limiter may limit between −Variable (lower) ≦ IdsT0 ≦ Variable (upper).

The output IdsT0 of limiter 48 is summed at node 54 with a look up table (IdsLUT) output for Ids from a maximum torque per ampere curve block 52, both of which are non-inverted, as shown, to produce the D-axis current command control signal Ids*. Block 52 is configured to receive the TORQUE* command control signal.

Turning now to the circuit 38 in FIG. 2, the Ids* signal and Idsf feedback signal are summed at the non-inverting (+) and inverting (−) inputs of node 34, respectively, to produce an error signal designated Id error, which is coupled to a parallel connected proportional gain circuit 56 and an integrating function circuit 58. Proportional circuit 56 produces an output that is coupled to the non-inverting input (+) of summing node 60. The integrating circuit 58 includes an input coupled to node 34. Circuit 58 also includes an input configured to receive a feedback signal from a clamp or limiting circuit 62 having a feedback loop 64 as shown. The output of circuit 58 is provided to clamp or limiter 62.

The proportional gain circuit 56 controls, among other things, the transient components of the Id error signal, and the integrating circuit 58 controls, among other things, steady state components of the Id error signal. The clamp 62, when implemented, is used to limit the steady state value within an allowable range (e.g., −Vmag*≦Vds≦Vmag*). The output of the clamp 62 is coupled to another non-inverting input (+) of summing node 60. The output of node 60 is the unclamped D-axis modulation index signal Vds. This signal is coupled to clamp or limiting circuit 66, and when engaged, the output of the clamp 66 is the clamped D-axis modulation index signal Vds. This may correspond as well to the range: −Vmag*≦Vds≦Vmag*. As shown in FIG. 1, the Vds signal is coupled to the transform circuit 22 and is fed back to the current command circuit 32. The clamp 66 limits the overall output Vds.

FIG. 3 shows, in greater detail, Q-axis control circuit 40 (i.e., PI current regulator). Iqs current command block 33 produces an output, thereof the Iqs* command control signal, in response to the torque command signal TORQUE* and feedback signal Idsf from transform block 24. The Q-axis reference or command signal Iqs* is coupled to the non-inverting input (+) of the node 36. The Iqsf feedback signal from transform circuit 24 is coupled to the inverting input (−) of the node 36. The node 36 produces an error signal designated $Iq_{error}$ signal. The Iq error signal is coupled to a proportional gain controller 70 and an integrator function block 72. Proportional gain circuit 70 controls, among other things, transient signals and the integrating circuit 72 controls, among other things, steady state signals. The output of the proportional gain circuit 70 is coupled to the non-inverting input (+) of a summing node 74. The output of the integrator 72 is coupled to a clamp or limiter 76. The clamp 76, when implemented, is used to limit the steady state value within an allowable range defined as follows:

MOTORING MODE: MIN≦Vqs≦[$\sqrt{Vmag^{*2}-Vds^2}$]*K

GENERATING MODE: MIN≦Vqs≦Vmag*K where MIN is a lower limit, and which is preferably zero.

The output of the clamp 76 is coupled to another non-inverting input (+) of summing node 74 and is fed back over feedback loop 78 to integrator 72, as shown. The signals are summed at node 74, and the output of the node 74 is the unclamped Vqs. This signal is coupled to a clamp or limiting circuit 80, and when engaged, the output of the clamp is a clamped Q-axis modulation index signal Vqs. This, in turn, is coupled to the transform circuit 22 and is fed back to the current command circuit 32 as shown in FIG. 1. The clamp 80 limits the overall output Vqs in accordance with the following equations:

MOTORING MODE: MIN≦Vqs≦[$\sqrt{Vmag^{*2}-Vds^2}$]*K

GENERATING MODE: MIN≦Vqs≦(Vmag*)K

These equations limit Vqs in the motoring mode to a quadrature voltage command signal limit value derived in the motoring mode from the square root of the quantity ((Vmag*)² − (Vds)²) and derived in the generating mode from the voltage magnitude command signal Vmag*.

When activated, clamps 66 and 80 limit the overall D and Q axis signals Vds and Vqs. Clamps 62 and 76 limit or clamp the steady state signals components of the Vds and Vqs signals.

Alternatively, Vds and Vqs limits can be calculated as follows:

If Delta is greater than Delta Maximum, Vds and Vqs are recalculated as follows:

Vds=−Vmag*[ sin(Delta Maximum)],

Vqs=Vmag*[ cos(Delta Maximum)],

If Delta is less than Delta Minimum, Vds and Vqs are recalculated as follows:

Vds=−Vmag*[ sin(Delta Minimum)],

Vqs=Vmag*[ cos(Delta Minimum)],

Where Delta is defined as follows:

Delta=arctan(−Vds/Vqs)

Delta must be within the following range:

Delta Minimum≦Delta≦Delta Maximum.

Activation of clamps 66 and 80 occurs when the unclamped Vds and unclamped Vqs are out of their respective, selected voltage vector ranges, i.e., magnitude and direction (delta angle). Once engaged, clamps 66 and 80, with corresponding clamps 62 and 76, are operative through feedback lines 67 and 81 to implement an algorithm according to the invention to limit Vds and Vqs to the clamped values shown.

From the foregoing, it can be seen that a new and improved device to regulate current consumed by a PM machine has been provided. It is to be understood that the description of the exemplary embodiments is merely illustrative of some of the many specific embodiments that represent applications of the principles of the present invention. Other arrangements would be evident to those skilled in the art without departing from the scope of the invention as defined by the following claims.

The invention claimed is:

1. A device to regulate current provided to a permanent magnet machine responsive to a plurality of phase current signals to produce torque on a shaft comprising:
   a processing and drive circuit responsive to a direct voltage command signal (Vds) and a quadrature voltage command signal (Vqs) to produce the plurality of phase current signals for input to the permanent magnet machine:
   a command circuit responsive to a torque input and configured to produce a direct current command signal (Ids) and a quadrature current command signal (Iqs);

a D-axis control circuit responsive to the direct current command signal (Ids) to produce the direct voltage command signal (Vds), the D-axis control circuit comprising a first clamp configured to limit the direct voltage command signal (Vds) to values less than or equal to a preselected level that is less than or equal to a voltage magnitude command signal (Vmag*);

a Q-axis control circuit responsive to the quadrature current command signal (Iqs) to produce the quadrature voltage command signal (Vqs), the Q-axis control circuit comprising a second clamp configured to limit said quadrature voltage command signal (Vqs) in accordance with the following in a motoring mode:

$$\text{MIN} \leq Vqs \leq \lfloor \sqrt{Vmag^{*2} - Vds^2} \rfloor * K.$$

2. A device to regulate current provided to a permanent magnet machine responsive to a plurality of phase current signals to produce torque on a shaft comprising:

a processing and drive circuit responsive to a direct voltage command signal (Vds) and a quadrature voltage command signal (Vqs) to produce the plurality of phase current signals for input to the permanent magnet machine;

a command circuit responsive to a torque input and configured to produce a direct current command signal (Ids) and a quadrature current command signal (Iqs);

a D-axis control circuit responsive to the direct current command signal (Ids) to produce the direct voltage command signal (Vds), the D-axis control circuit comprising a first clamp configured to limit the direct voltage command signal (Vds) to values less than or equal to a preselected level that is less than or equal to a voltage magnitude command signal (Vmag*);

a Q-axis control circuit responsive to the quadrature current command signal (Iqs) to produce the quadrature voltage command signal (Vqs), the Q-axis control circuit comprising a second clamp configured to limit said quadrature voltage command signal in accordance with the following in a generating mode:

$$\text{MIN} \leq Vqs \leq (Vmag^*) * K.$$

3. A device to regulate current provided to a permanent magnet machine responsive to a plurality of phase current signals to produce torque on a shaft comprising:

a processing and drive circuit responsive to a direct voltage command signal and a quadrature voltage command signal, said processing and drive circuit configured to produce said plurality of phase current signals for input to said permanent magnet machine;

a current regulator including, a command circuit responsive to a torque input command signal configured to produce a direct current command signal and a quadrature current command signal;

a control circuit responsive to the direct and quadrature current command signals configured to produce said direct and quadrature voltage command signals; and a limiter configured to limit the direct and quadrature voltage command signals to a preselected level, wherein said limiter is operative to limit said direct voltage command signal (Vds) and said quadrature voltage command signal Vqs as follows:

$$Vds = -Vmag^*[\sin(\text{Delta Maximum})],$$

$$Vqs = Vmag^*[\cos(\text{Delta Maximum})],$$

Where Delta is greater than Delta Maximum and where Delta is defined as follows:

$$\text{Delta} = \arctan(-Vds/Vqs) \text{ and}$$

where Delta must be within the following range:

Delta Minimum ≦ Delta ≦ Delta Maximum.

4. A device to regulate current provided to a permanent magnet machine responsive to a plurality of phase current signals to produce torque on a shaft comprising:

a processing and drive circuit responsive to a direct voltage command signal and a quadrature voltage command signal, said processing and drive circuit configured to produce said plurality of phase current signals for input to said permanent magnet machine;

a current regulator including, a command circuit responsive to a torque input command signal configured to produce a direct current command signal and a quadrature current command signal;

a control circuit responsive to the direct and quadrature current command signals configured to produce said direct and quadrature voltage command signals; and a limiter configured to limit the direct and quadrature voltage command signals to a preselected level, wherein said limiter is operative to limit said direct voltage command signal (Vds) and said quadrature voltage command signal (Vqs) as follows:

$$Vds = -Vmag^*[\sin(\text{Delta Minimum}]$$

$$Vqs = Vmag^*[\cos(\text{Delta Minimum})]$$

Where Delta is less than Delta Minimum, and where Delta is defined as follows;

$$\text{Delta} = \arctan(-Vds/Vqs) \text{ and}$$

where Delta must be in within the following range:
Delta Minimum ≦ Delta ≦ Delta Maximum.

5. A device to regulate current provided to a permanent magnet machine responsive to a plurality of phase current signals to produce torque on a shaft comprising:

a processing and drive circuit responsive to a direct voltage command signal (Vds) and a quadrature voltage command signal (Vqs) to produce the plurality of phase current signals for input to the permanent magnet machine;

a command circuit responsive to a torque input and configured to produce a direct current command signal (Ids) and a quadrature current command signal (Iqs);

a D-axis control circuit responsive to the direct current command signal (Ids) to produce the direct voltage command signal (Vds), the D-axis control circuit comprising a first clamp configured to limit the direct voltage command signal (Vds) to values less than or equal to a preselected level;

a Q-axis control circuit responsive to the quadrature current command signal (Iqs) to produce the quadrature voltage command signal (Vqs), the Q-axis control circuit comprising a second clamp configured to limit the quadrature voltage command signal (Vqs) in a motoring mode to values less than or equal to a quadrature voltage command signal limit value derived from the square root of the absolute difference between the square of the voltage magnitude command signal (Vmag*) and the square of the direct voltage command signal (Vds).

6. A device to regulate current provided to a permanent magnet machine responsive to a plurality of phase current signals to produce torque on a shaft comprising:

a processing and drive circuit responsive to a direct voltage command signal (Vds) and a quadrature voltage command signal (Vqs) to produce the plurality of phase current signals for input to the permanent magnet machine;

a command circuit responsive to a torque input and configured to produce a direct current command signal (Ids) and a quadrature current command signal (Iqs);

a D-axis control circuit responsive to the direct current command signal (Ids) to produce the direct voltage command signal (Vds), the D-axis control circuit comprising a first clamp configured to limit the direct voltage command signal (Vds) to values less than or equal to a preselected level;

a Q-axis control circuit responsive to the quadrature current command signal (Iqs) to produce the quadrature voltage command signal (Vqs), the Q-axis control circuit comprising a second clamp configured to limit the quadrature voltage command signal (Vqs) in a generating mode to values less than or equal to a quadrature voltage command signal limit value derived from the voltage magnitude command signal (Vmag*).

* * * * *